July 23, 1957 C. E. LOMAX 2,800,533

SELECTOR 11 LEVEL

Filed Sept. 20, 1955 2 Sheets-Sheet 1

*INVENTOR.*
CLARENCE E. LOMAX

*BY* [signature]

ATTY.

SELECTOR 200

*INVENTOR.*
CLARENCE E. LOMAX
*BY* Wm. Walter Owen
ATTY.

2,800,533

SELECTOR 11 LEVEL

Clarence E. Lomax, Chicago, Ill., assignor to General Telephone Laboratories, Incorporated, a corporation of Delaware Application September 20, 1955, Serial No. 535,337

5 Claims. (Cl. 179—18)

Figure 1:
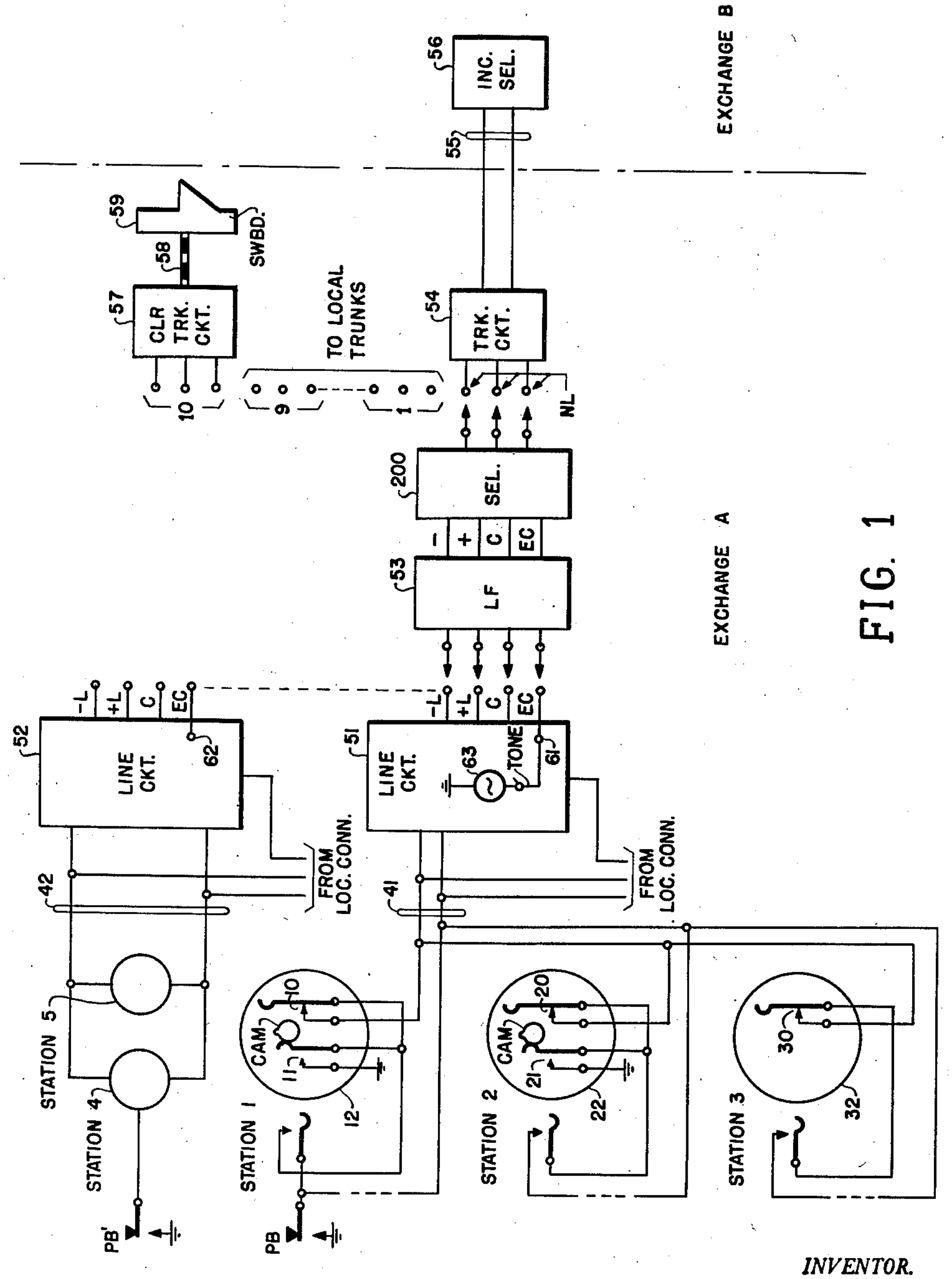

The present invention relates to telephone systems in general, but is more particularly concerned with telephone systems having restricted service facilities.

In my copending application Serial No. 519,083, filed June 30, 1955, there is described a telephone system in which calls made in certain traffic directions are subject to restrictions on a station basis. This is accomplished by providing some substations with a conventional calling device and other substations with a special calling device having an auxiliary, cam-operated contact for momentarily grounding the line conductors near the end of the return movement of the device and incoincidently with the actuation of the impulse springs. A differential relay in a switch giving access to the aforementioned traffic direction either operates or not dependent upon the presence of this ground pulse to determine whether or not predetermined restrictions are to be imposed on calls made from the last-mentioned class of substations in these directions. Due to the manner in which the grounding of the line is effected by the special calling device, proper transmission of the digital impulses over the calling loop is not interfered with. Yet, since this class-of-service method operates on a station basis, it is possible with this arrangement to assign substations of different service classification to the same party line.

It is the primary object of the present invention to provide means for rendering restricted service arrangements of this general description even more flexible.

Another object of the invention is to provide novel and improved means for facilitating the use of this type of arrangements in connection with normal-level switches.

A further object of the invention is to provide a class-of-service system involving three classes of subscribers, viz. a first or privileged class whose substation is equipped with a special dial and a push button, a second or semi-privileged class whose substation is only equipped with a dial of the above-mentioned special type, and a third or restricted class whose substation is provided with a conventional dial only.

According to one feature of the invention there is provided a selector with an eleventh or normal level of bank contacts. The privileged class subscriber, for example, can use a push button at his substation to momentarily ground the line without digital pulses being sent. This momentary ground received by a differential relay in the selector at the time of seizure will cause the selector immediately to rotate its wipers over the normal level without taking a vertical step and thus allow such a station to connect with special equipment or services that are not within the reach of stations of the other two classes.

According to another feature of the invention the same differential relay in the selector serves to determine whether or not restrictions are to be imposed on calls to the toll operator, viz. when the selector in the absence of the above push button generated ground pulse has been set on its toll level, e. g. level ten, in response to the receipt of digital impulses. More particularly, if a subscriber of the restricted class attempts to make a toll call, the selector acts to place a denial tone on the operator's trunk reached over that level. As a result, the operator will inform the subscriber that he is not entitled to toll connections or she will otherwise deal with this call as required. On the other hand, if the call originates at a substation of the privileged or semi-privileged class, the ground pulse transmitted by the special dial at this substation will operate the differential relay which will then prevent connection of the denial tone to the operator's trunk.

Figure 2:
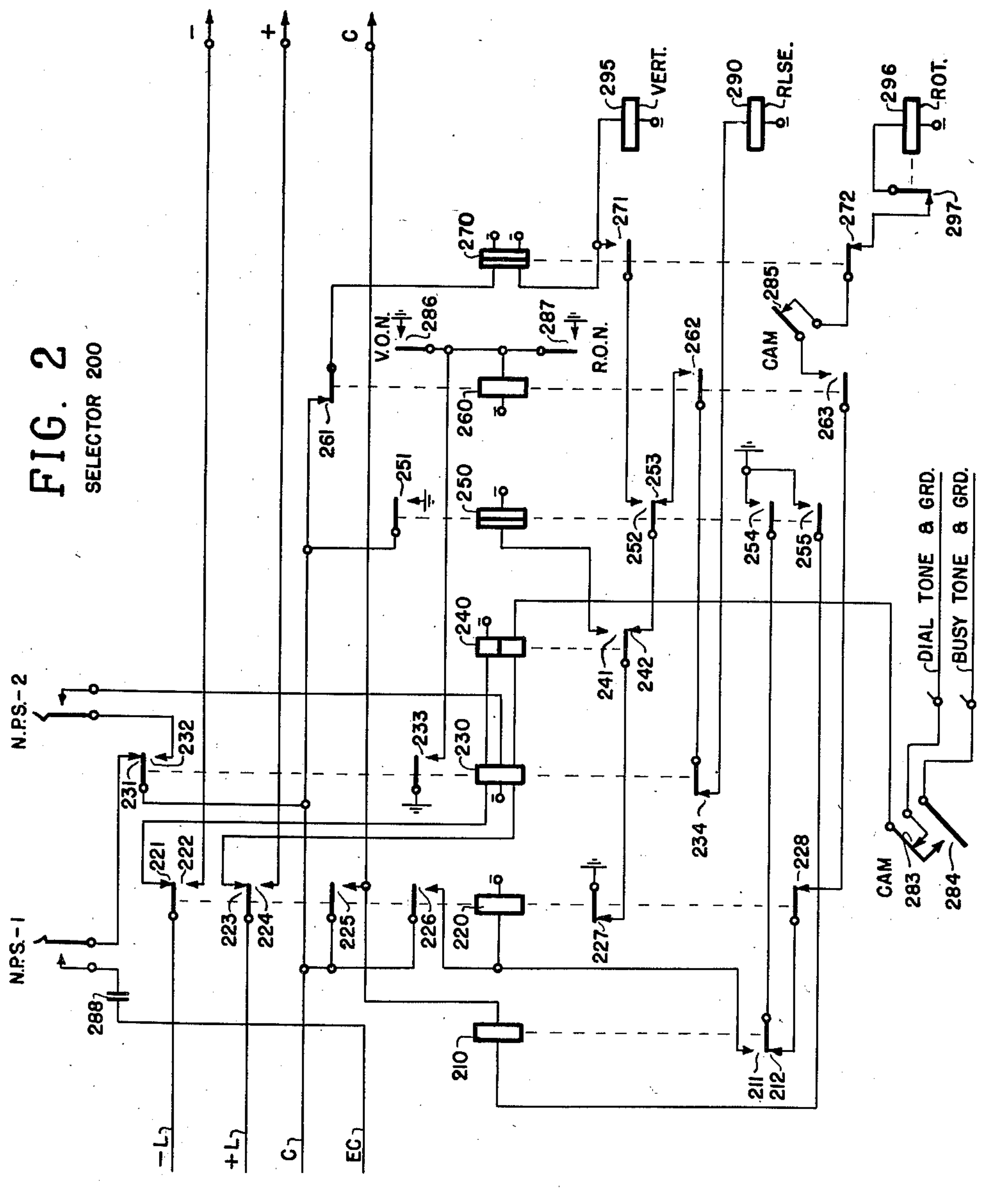

The novel features believed to be characteristic of the invention are set forth with particularity in the appended claims. The invention, both as to its organization and method of operation, together with further objects and advantages thereof, will best be understood by reference to the specification, taken in connection with the accompanying drawings in which:

Fig. 1 illustrates the general arrangement of a system having the above-outlined features of the invention incorporated therein, Fig. 2 illustrates the circuit arrangement of the proposed normal-level selector.

Referring now to Fig. 1, there is shown the trunking layout of a public automatic telephone exchange A to which there are connected two party lines 41 and 42 terminating in line circuits 51 and 52 respectively. The substations connected to party line 41 are of three different classes. Substation 1 belongs to a privileged class having a non-locking push button PB and a special dial 12 equipped with impulse contacts 10 and with auxiliary contacts 11 which are actuated by a lobe on the associated cam indicated. Substation 2 likewise is equipped with a dial 22, of the special type but no push button is provided at this substation. It represents the semi-privileged class of subscribers. Substation 3, for which a conventional calling device 32 is provided having impulse contacts 30 only, represents the restricted class of subscribers. It should be understood, of course, that each of dials 12, 22 and 32 also is provided with the usual shunt springs, not shown, for shunting the receiver and transmitter while the dial is off-normal. In connection with special dials 12 and 22 having the cam actuated auxiliary contacts reference is made to United States Patent 2,366,647 which issued to J. E. Ostline on January 2, 1945.

Party line 42 has substations of only two classes connected thereto. Substation 4 belongs to the privileged class; it has a push button but for reasons that will become apparent further below in the description neither this substation nor the other substation 5 which being of the semi-privileged class has no push button, needs to be equipped with the special dial, i. e. each of these stations on line 42 has the conventional dial.

Line circuits 51, 52 and line finder 53 are of the conventional type and are equipped with a fourth conductor EC. More particularly, this EC conductor is terminated in a special terminal, such as 61 and 62, provided in each line circuit. As shown in Fig. 1, line circuit 51 which is associated with three-class party line 41 has a common source of denial tone 63 connected to its special terminal 61, while special terminal 62 of line circuit 52 terminating two-class party line 42 is left disconnected. The omission of the tone connection in line circuit 52 makes it possible to equip the first- and second-class substations on the associated party line 42 with conventional dials. Apart from this fourth-conductor-signaling feature line circuits 51, 52 and line finder 53 may be of the general type disclosed, for example, in United States Patent 2,214,908 issued to C. E. Lomax on September 17, 1940.

The selector 200 is provided with a normal level, to which automatic trunk circuits such as 54 are connected for extending short haul toll calls to a distant exchange B, as indicated by interoffice trunk 55 and the associated incoming selector 56 in that exchange. An operator's switchboard 59 in exchange A for manually extending long-distance toll calls is connected by way of CLR trunk circuits and trunks, such as 57 and 58 respectively, to the tenth level of selector 200. It may be pointed out at this juncture that trunk circuit 54 is of conventional type and that trunk circuit CLR may be similar to the one shown in Fig. 5 of my copending application Serial No. 215,561, filed March 14, 1951, now Patent 2,733,295, issued January 31, 1956.

As will become clear from the following detailed description of selector 200, Figs. 1 and 2, this selector is arranged to give subscribers of all three classes access over any of levels 1–9 to the local switch train and over level 10 to the toll board except that on toll calls initiated by a restricted subscriber denial tone is forwarded to the toll operator. Only privileged subscribers, i. e. those having a push button may cause the selector to cut in on its normal level for dialing access to exchange B.

Referring now to Fig. 2, normal-level selector switch 200 is assumed to be of the Strowger type and comprises a test relay 210, a switching relay 220, a differential relay 230, a line relay 240, a hold relay 250, an auxiliary relay 260 and a changeover relay 270. Two sets of normal post springs NPS–1 and NPS–2 are provided for controlling the connection of denial tone received by way of the extra conductor EC, to the test wiper of the selectors. Both of these sets of springs close on the tenth level of the switch only.

After having thus described the apparatus involved in the instant embodiment, the operation of the telephone system in extending telephone connections by way of selector 200 will now be described in detail.

Assuming the subscriber at substation 1, Fig. 1, initiates a manual toll call, upon lifting the telephone handset the subscriber is connected by way of subscriber line 41, line circuit 51 and line finder 53 to the selector 200 in the well known manner.

Referring now to Fig. 2, the seizure of selector 200 results in the energization of the upper winding of the changeover relay 270 over the following path: ground on the incoming conductor C, contacts 261 through the upper winding of relay 270 to battery. Relay 270, upon operating, closes contacts 271 to prepare a locking circuit for itself as well as a circuit to the vertical magnet 295, and at contacts 272 opens a point in the circuit to the rotary magnet 296. Also on seizure of the selector, line relay 240 is operated in the well known manner via contacts 221 and 223 and the negative and positive incoming conductors −L and +L respectively. The differential relay 230 does not operate at the present moment. Relay 240, in closing contacts 241, operates hold relay 250 from ground at contacts 227 and thereby causes ground potential to be placed via contacts 251 on the incoming conductor C in order to hold the preceding equipment. Relay 250, in closing contacts 252, closes another point in the circuit to the lower winding of relay 270 and the vertical magnet. Furthermore, relay 250, in closing contacts 254, prepares a circuit to the rotary magnet 296 and to switching relay 220, and, in closing contacts 255, closes a point in the circuit for test relay 210.

The selector switch 200 is now conditioned to respond to the dialing of the digit, "0" at the calling subscriber substation 1. When the subscriber at substation 1 dials this digit, line relay 240 in selector 200 follows the impulses transmitted by the intermittent opening of the loop circuit at impulse springs 10 during the return movement of dial 12. Each time line relay 240 restores and then reoperates it interrupts and then recompletes, at contacts 241, the previously traced circuit of hold relay 250, which thus remains operated during the digit by virtue of its slow release characteristics. It further completes and then interrupts, at contacts 242, a circuit, including contacts 227, 242, 252 and 271 for energizing vertical magnet 295 and the lower winding of changeover relay 270 in multiple. Changeover relay 270, being of the slow-to-release type remains operated during the digit; and the vertical magnet is operated ten times, in this instance corresponding to the number of impulses of the digit, 0, dialled at the calling subscriber station 1.

When the wiper carriage of the Strowger mechanism (not shown) is driven away from its home position, vertical off-normal springs 286 are actuated to operate relay 260 over an obvious circuit. Upon operation, relay 260 at contacts 261 interrupts the previously traced circuit for energizing the upper winding of relay 270; however, the later relay is maintained in its operated position, at this time, by virtue of the intermittent completion of the previously traced circuit through its lower winding.

Subsequent to the last opening of impulse springs 10 and before dial 12 reaches normal position the auxiliary contacts 11 of this dial at substation 1 are actuated by the lobe of the associated cam for momentarily upsetting the balance of the loop circuit and thereby operating differential relay 230 from ground at auxiliary contacts 11 via impulse contacts 10, negative talking conductor, the upper winding of relays 230 and 240 to battery. Since the switch has been moved to its tenth vertical position and the normal post springs are actuated in this position, differential relay 230, upon operation, in response to the momentary closure of auxiliary contacts 11, is now held in a locking circuit extending from ground at contacts 251 via contacts 232 and NPS–2 through the center winding of relay 230 to battery. Differential relay 230 by opening its contacts 231 also prevents the subsequent transmission of denial tone to the toll operator.

Following the transmission of the last dial pulse line relay 240 reoperates and remains operated, during transmission of the ground pulse by contacts 11. Due to the opening of contacts 242 changeover relay 270 restores with a slight delay. Upon restoring, changeover relay 270 completes, at contacts 272, the operating circuit for the rotary magnet 296, this circuit extending from ground at contacts 254, through contacts 212, 228, 263, CAM contacts 285, contacts 272, 297 and through the winding of the rotary magnet 296 to battery. Upon operating, the rotary magnet 296 at its interrupter spring 297 interrupts the last traced operating circuit; whereby the rotary magnet 296 operates in buzzer fashion to drive the wiper carriage of the Strowger mechanism step by step in the rotary direction.

When the wiper carriage of the Strowger mechanism (not shown) is driven one step in the rotary direction, the first of CLR trunk circuits connected to the tenth level is tested. Battery potential appears upon the test conductor C of this trunk circuit in the event the trunk circuit is idle; conversely, ground potential appears upon this test conductor if the trunk is busy. Ground potential on this test conductor of the tested trunk circuit keeps the winding of test relay 210 short-circuited so that the above-traced self-interrupter circuit of the rotary magnet is maintained. Accordingly, the rotary magnet effects automatic operation of the Strowger mechanism in the rotary direction until an idle trunk circuit, say 57, is found, whereupon test relay 210 operates. Upon operating, relay 210 interrupts, at contacts 212, the previously traced circuit for operating the rotary magnet, whereby further operation of the rotary magnet is prevented. Also, upon operating test relay 210, completes, at contacts 211, an obvious circuit for operating switching relay 220. Relay 220 in operating interrupts, at contacts 221 and 223, the previously traced loop circuit extending over the talking conductors to the upper and lower windings of relays 230 and 240, causing the later relay to restore while differential relay 230 remains held over its center winding. Also, upon operating, switch-through relay 220 at contacts 222 and 224 extends the loop circuit to CLR trunk circuit 57, whereupon ground potential is returned by this circuit over the test wiper of selector 200 to complete an alternative holding circuit, including contacts 225 and 226 for maintaining switch-through relay 220 operated. Relay 240, upon restoring, at contacts 241 opens the circuit to relay 250 so that this relay restores. In addition to relay 210, relay 230 and also the preceding switches are now held by the aforementioned ground returned over the test conductor of trunk circuit 57.

Upon seizure of CLR trunk circuit 57 the corresponding calling lamp at switchboard 59 is lighted by way of trunk connections 58, Fig. 1, in the manner explained in detail in my above-mentioned copending application Serial No. 215,561, now Patent 2,733,295. Since the connection of denial tone to the C wiper of selector 200 was prevented, at contacts 231, due to the operation of differential relay 230, the operator upon answering the call will receive no such tone. She will, therefore, proceed to manually complete the toll connection desired by the privileged subscriber.

At the end of the conversation, after both the calling subscriber and the operator have disconnected, CLR trunk circuit 57 upon releasing will remove ground from the test conductor, thereby permitting switching relay 220 and differential relay 230, Fig. 2, as well as the preceding equipment to release. Upon restoration of relays 220 and 230 the following circuit is completed for the release magnet: ground, contacts 227, 242, 253, 262, 234, magnet 290 and battery. The switch mechanism of selector 200 accordingly is restored to normal. The opening of off-normal contacts 287 and, subsequently, 286 permits relay 260 to release and open the release magnet circuit at contacts 262. At contacts 261 battery is reconnected to the incoming test conductor, thereby rendering selector 200 available again to further calls.

Returning to the operation of selector 200 after its wipers have been positioned on the tenth level, should all trunk circuits connected to this level be found busy, the automatic stepping action of the rotary magnet will continue until the wipers of the switch have reached the eleventh rotary or overflow position wherein the cam springs are actuated. At contacts 285 the rotary action is arrested and at contacts 284, 283 busy tone and ground is substituted for dial tone and ground so that a busy indication is given to the calling subscriber. When the subscriber thereupon replaces his handset, relay 240 and hence, relays 250 and 230 are permitted to release. The further release operations are similar to those described above.

The calling device 22 at substation 2 being of the same construction as calling device 12 at station 1, the functioning of the switching equipment on calls to the toll operator initiated at substation 2 is exactly the same as described with respect to such a call when initiated by the subscriber at substation 1.

Assuming now that substation 3 attempts to make a manual tool call, upon lifting the telephone handset, the subscriber at substation 3 is connected by way of the subscriber line 41, line circuit 51 and line finder 53 to selector 200 in a similar manner as previously described for a toll call from substation 1.

It is understood that the calling device at substation 3 has no auxiliary contacts corresponding to contacts 11 at station 1. Thus when the subscriber at substation 3 dials the digit "0," the wipers of selector 200 are raised opposite to the tenth level and normal post springs NPS–1 and NPS–2 are operated, but differential relay 230 is not operated as no ground pulse is transmitted from dial 32. Thus, when switching relay 220 operates incident to the seizure of idle CLR trunk circuit 57 in the manner described above, denial tone is permitted to be applied to the test conductor of this trunk circuit, viz. by way of the following circuit path: ground, tone source 63 connected to terminal 61 in line circuit 51, EC conductor in finder 53 and selector 200, condenser 288, contacts NPS–1, 231 and 225, C wiper of selector 200, test conductor (not shown) in CLR trunk circuit 57.

As will be clear from the disclosure of my above-mentioned copending application, Serial No. 215,561 now Patent 2,733,295, this test conductor is terminated, upon operation of the hold relay in the CLR trunk circuit, Fig. 5 of that application, by ground through the low resistance primary winding of an induction coil. When the operator at switchboard 59, Fig. 1, answers the call the secondary winding of this induction coil is connected momentarily to the line conductors of the trunk circuit so that the operator will bear the denial tone in her telephone instrument. The operator will accordingly notify the calling subscriber that he is restricted from making toll calls or she will otherwise deal with the matter as circumstances may require. After the calling party and the operator have disconnected, the switching equipment will be restored to normal as above described.

Assuming subscriber at substation 1 wishes to make an automatic, short-haul toll call, upon lifting the telephone handset, the subscriber is connected by way of subscriber line 41, line circuit 51 and line finder 53 to selector 200 in the manner briefly described above. As soon as the subscriber hears the dial tone he depresses push button PB whereby differential relay 230 is operated immediately upon seizure of the selector, viz. from ground at push button PB via the negative talking conductor, the upper winding of relay 230, and the upper winding of relay 240 to battery. Relay 230, at contacts 233, closes an obvious circuit to relay 260. Relay 240 operates to operate relay 250 and thereby to close contacts 254 and 255. Relay 260, in opening contacts 261, interrupts the operating circuit extending through the upper winding of relay 270; and in closing contacts 263, prepares a circuit to the rotary magnet 296. Relay 270, upon restoring, at contacts 272 completes the above-traced circuit to rotary magnet 296. Upon operating, the rotary magnet 296 interrupts a point, at its interrupter spring 297 of the last traced operating circuit therefor; whereupon the rotary magnet 296 operates buzzer fashion in order to drive the wiper carriage of the Strowger mechanism step by step over the normal level of the switch in search of a trunk circuit such as 54, no vertical step being taken by selector 200 in the instant case. Differential relay 230 restores upon release of push button PB but, due to rotary off-normal contacts 287 closing a multiple circuit to relay 260 upon the first rotary step, rotary action is maintained after release of the differential relay. When an idle trunk circuit, for example, 54 has been found test relay 210 operates to arrest the switch and cause the operation of switching relay 220 substantially in the same manner as described above for a call over the tenth level of the switch. As the normal post springs remain open on all levels except the tenth, connection of denial tone to the test wiper which is required only on calls to toll board 59 is prevented in the instant case, whereby an unnecessary drain on the denial tone source on calls over the normal level, and similarly on calls over any of levels 1–9 is avoided.

At contacts 222, 224 of switching relay 220 the calling loop is now extended to trunk circuit 54 so that the calling subscriber upon actuating his calling device may position the incoming selector 56 in exchange B to automatically extend the connection to a called subscriber in this or yet another exchange in the well-known manner. As trunk circuit 54 and the switches in exchange B are assumed to be of conventional design and, therefore, have no differential relay corresponding to relay 230, Fig. 2, the ground pulse transmitted by contacts 11 of dial 12 has no effect on any of these circuits or switches. When the calling subscriber replaces his handset at the end of the conversation, the release of trunk circuit 54 removes ground from the test conductor to permit all preceding switches to release.

Reverting to the operation of differential relay 230, Fig.

2, in the present type of call it will be understood that push button PB must be depressed long enough to permit relay 270 to restore and the switch wipers take their first rotary step to insure the holding of relay 260 over rotary off-normal contacts 287. While this time element will ordinarily pose no problem it is also possible, if desired, to avoid it altogether by arranging the normal post springs to be actuated on the normal level also. In that case differential relay 230 upon operation will lock over its center winding and contacts NPS–2 and 232 to ground on the C conductor as described above for a call over the tenth level, whereby relay 260 is held over contacts 233 and denial tone kept disconnected at contacts 231.

It will readily be understood that the subscribers at substation 2 or 3 cannot gain access to the normal level of selector 200 and hence cannot obtain automatic dialing access to exchange B as they are not equipped with a device such as push button PB for operating differential relay 230, Fig. 2, prior to actuation of the calling device.

On the other hand it will be appreciated that any of subscribers 1, 2 or 3 can reach the local switch train, viz. by dialing any of digits 1–9 upon lifting the receiver. If such a call is originated at substation 1 or 2 having the special dial, differential relay 230 operates momentarily at the end of the digit but since the normal post springs do not close on any of these levels, relay 230 is unable to lock and restores at the end of the ground pulse without effect. Thus, any subscriber on party line 41 may establish local calls without restrictions of any sort.

As mentioned above, terminal 62 in line circuit 52 has no denial tone source connected thereto. Therefore, when selector 200 is set on its tenth or toll level in a call from a privileged substation such as 4 or a semi-privileged station such as 5 on party-line 42, differential relay 230 need not be operated at the end of the digit to prevent the forwarding of denial tone to the toll operator on calls from these stations. Hence it is not necessary to equip substations 4 and 5 with the special type dial for this purpose. Furthermore it will be clear that while the subscriber at substation 4 by depressing push button PB′ upon lifting his handset, is able to make selector 200 cut in on its normal level and is then able to initiate short-haul toll calls to exchange B, the subscriber at station 5 having no such push button is deprived of this privilege. Thus the arrangement shown in connection with party-line 42 illustrates how the invention permits the use of conventional dials on party lines having first-class and second-class substations only and, of course, also on individual lines having a substation of either of these two types, while at the same time providing restricted service on a station basis in connection with three-class party lines as described.

While there has been described what is at present considered to be the preferred embodiment of the invention, it will be understood that various modifications may be made therein and it is intended to cover in the appended claims all such modifications as fall within the true spirit and scope of the invention. For example, it will be clear that selector 200, Fig. 2, need not necessarily be of the Strowger or up-and-around type. Also while the invention has been illustrated herein in connection with a public exchange, the principles underlying the invention are equally applicable to private automatic branch exchanges, for example. In this case the normal-level selector could be arranged to give privileged subscribers access over its normal level to public exchange trunks and afford access over its tenth level to the PABX attendant. All PABX subscribers could reach the attendant in this manner but on calls from restricted (third class) subscribers the attendant would receive the denial tone as an indication that the particular subscriber is not entitled to outgoing calls or certain types of outgoing calls to the public exchange.

What is claimed is:

1. In a telephone system, an automatic switch having vertical and rotary movements and having a plurality of wipers, said wipers having a normal position and a plurality of off-normal vertical positions, a normal level of bank contacts accessible to said wipers in said normal position and having a plurality of automatic toll trunks connected thereto, a predetermined off-normal level of bank contacts accessible to said wipers from a predetermined off-normal vertical position and having a plurality of manual toll trunks connected thereto, three class of subscriber substations comprising a privileged class, a semi-privileged class, and a restricted class, a push button with a source of ground potential thereon for each privileged substation, a calling device at each privileged and semi-privileged substation having impulse contacts and auxiliary contacts, a calling device at each restricted substation having only impulse contacts, a line relay and a differential relay in said switch, an incoming trunk having a pair of line conductors and an extra conductor, means responsive to the initiation of a call by any one of said substations for extending a loop circuit over said pair of line conductors from the impulse springs of the calling device of the calling substation to said two relays to operate said line relay and seize said switch, said differential relay operated in response to the actuation of the push button after seizure of said switch in case the calling substation is a privileged substation for automatically causing said wipers to be rotated in said normal level to seize an idle automatic toll trunk, said loop circuit intermittently opened in response to the operation of the impulse contacts of the calling device of any calling one of said substations after seizure of said switch for operating said line relay to raise said wipers opposite said predetermined off-normal level in case said calling substation initiates a manual toll call, means for rotating said wipers in said predetermined off-normal level to seize an idle manual toll trunk, a source of denial tone associated with said extra conductor, sets of normal post springs actuated only when said wipers are raised to said predetermined off-normal level, a tone connection including said extra conductor and said actuated sets of normal post springs for operatively connecting said denial tone source to said seized manual toll trunk in case the calling substation is a restricted substation, said differential relay operated by the auxiliary contacts of the operated calling device in case the calling substation is a privileged or semi-privileged substation for opening a point in said tone connection to disconnect said denial tone source from the seized manual toll trunk.

2. In a telephone system, a numerical switch having a plurality of wipers and levels of bank contacts including a normal level and at least one off-normal level, said wipers normally resting opposite said normal level and also movable in a primary and secondary direction, sets of outlets connected to the bank contacts of said normal and off-normal levels, a trunk incoming to said switch and having a pair of line conductors, means for seizing said switch over said line conductors, means for transmitting digital impulses over said line conductors, privileged means for unbalancing said line conductors after seizure of said switch, discriminating means for unbalancing said conductors subsequent to the transmission of a series of digital impulses to said switch, a line relay and a differential relay in said switch connected to said conductors, said differential relay being responsive to the operation of said privileged unbalancing means after seizure of said switch for causing said wipers to select a set of outlets in said normal level, said line relay being responsive to digital impulses received over said conductors causing said wipers to select a set of outlets in said one off-normal level, said differential relay being responsive in case said discriminating means unbalances said conductors after transmission of said digital impulses for causing said selected set of outlets in said one off-normal level to complete a connection indicating a non-restricted class of call, and said differential relay non-responsive in case of an absence of an unbalancing of said line conductors after transmission of said digital impulses for causing said selected set of outlets in said one off-normal level to complete a connection indicating a restricted class of call.

3. In a telephone system a party line having three classes of substations comprising a first, a second and a third class, a numerical switch having a plurality of wipers, a normal level and an off-normal level of bank contacts accessible to said wipers, said wipers normally resting opposite said normal level and also movable in a primary and a secondary direction to select a bank contact in said off-normal level, means including a pair of conductors for completing a trunk connection between any calling one of said substations and said switch, a calling device having impulse contacts at each substation intermittently operated during the return movement of the calling device following actuation thereof, a line relay and a differential relay in said switch, a loop circuit extending over said conductors from the impulse contacts of the calling device of said calling substation to said two relays, manual means at only the first class substation for momentarily grounding said conductors at will and the calling devices at only the first and second class substations having auxiliary contacts momentarily closed near the end of the operation of said impulse contacts for grounding said conductors, said differential relay operated in response to the actuation of said manual means after seizure of said switch in case the calling substation is the first class substation for advancing said wipers from their normal resting position in only said secondary direction to select a set of bank contacts in said normal level, said line relay responsive to digital impulses sent over said loop circuit by the impulse contacts of the calling device of any calling one of said substations after seizure of said switch for advancing said wipers in their primary and secondary directions to select a set of bank contacts in said off-normal level, said differential relay being responsive to the auxiliary contacts grounding said conductors after transmission of said digital impulses in case the calling substation is either said first or said second class substation for indicating a non-restricted class of call extended over said off-normal level, said differential relay being non-responsive after transmission of said digital impulses in case the calling substation is said third class substation for indicating a restricted class of call extended over said off-normal level.

4. In a telephone system as claimed in claim 3 including an extra conductor, a source of denial tone associated with said extra conductor, an operator switchboard, manual toll trunks connecting said switchboard to the bank contacts in said off-normal level, means for connecting said denial tone source to the manual toll trunk connected to said selected bank contacts in said off-normal level in case the calling substation is said third class substation to transmit said tone over said selected manual toll trunk to the operator switchboard to thereby indicate a restricted call, contacts operated by said differential relay for disconnecting said denial tone source from the manual toll trunk connected to said selected bank contacts in said off-normal level in case the calling substation is either said first or said second class substation to thereby prevent the transmission of said tone over said selected manual toll trunk to indicate a non-restricted call.

5. In a telephone system, a privileged class of substations, a semi-privileged class of substations, and a restricted class of substations, a push button with a source of ground potential at each privileged substation, a calling device at each said privileged and semi-privileged substations having impulse contacts and auxiliary contacts, a calling device at said restricted substations having only impulse contacts, a numerical switch having a plurality of wipers and levels of bank contacts, an incoming trunk having a pair of conductors and an extra conductor, means for connecting any calling one of said substations to said switch over said conductors, said levels of bank contacts including a normal level, a predetermined off-normal level, and remaining off-normal levels, automatic toll trunks terminating in the bank contacts of said normal level, manual toll trunks terminating in the bank contacts of said predetermined off-normal level, and local trunks terminating in the bank contacts of said remaining off-normal levels, said wipers in their normal position resting opposite said normal automatic toll trunk level, a line relay and a differential relay in said switch, a loop circuit extending over said pair of conductors from any one of said calling devices to said line and differential relays, means including said differential relay operative in response to the actuation of the push button at the connected substation in case the connected substation is a privileged substation for causing said wipers to move from their normal positions to select an automatic toll trunk in said normal level, said loop circuit intermittently opened in response to the operation of the impulse contacts of the connected calling device following actuation thereof, said line relay operated in response to the actuation of said impulse contacts of the connected calling device for causing said wipers to be directively advanced from their normal position in a primary direction to a position opposite any selected off-normal level and to thereafter automatically advance in a secondary direction to select a trunk in the selected off-normal level to thereby connect the calling substation to a local trunk or a manual toll trunk dependent upon the level selected by the operation of said impulse contacts, a source of denial tone associated with said extra conductor, a first set of normal post springs operated only in case said wipers are directively operated to said predetermined off-normal level for connecting said denial tone source to the selected manual toll trunk in said predetermined off-normal level, said first set of normal post springs remaining inoperative in case said wipers are directively advanced to any one of said remaining off-normal levels to thereby prevent the connection of said denial tone source to a selected local trunk, said differential relay being operated by said auxiliary contacts of the operated calling device in case the calling substation is a privileged or semi-privileged substation, a second set of normal post springs, a locking circuit for said differential relay including said second set of normal post springs, and means operated by said differential relay for closing said locking circuit and for disconnecting said denial tone source from said selected manual toll trunk whereby the transmission of said denial tone over the selected manual toll trunk is prevented on calls from a substation of the privileged or semi-privileged class while said denial tone is transmitted over the selected manual toll trunk in case the calling substation is of the restricted class.

References Cited in the file of this patent

UNITED STATES PATENTS

| | | |
|---|---|---|
| 2,494,475 | Hersey | Jan. 10, 1950 |
| 2,567,650 | Morris | Sept. 11, 1951 |
| 2,670,406 | Elliott | Feb. 23, 1954 |